(12) United States Patent
Li et al.

(10) Patent No.: US 8,948,098 B2
(45) Date of Patent: Feb. 3, 2015

(54) FRAME TRANSMISSION METHOD USING PRECODING FOR SUPPORTING MU-MIMO, AND BASE STATION SUPPORTING THE FRAME TRANSMISSION METHOD

(75) Inventors: Jianjun Li, Seongnam-si (KR); Zhengzi Li, Seongnam-si (KR); Jung Nam Yun, San Jose, CA (US); Dong Jun Lee, Seoul (KR); Jae Hyeong Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 542 days.

(21) Appl. No.: 12/990,861

(22) PCT Filed: Apr. 30, 2009

(86) PCT No.: PCT/KR2009/002319
§ 371 (c)(1),
(2), (4) Date: Feb. 24, 2011

(87) PCT Pub. No.: WO2009/136709
PCT Pub. Date: Nov. 12, 2009

(65) Prior Publication Data
US 2011/0134859 A1 Jun. 9, 2011

(30) Foreign Application Priority Data
May 3, 2008 (KR) .......................... 10-2008-0041602

(51) Int. Cl.
*H04W 4/00* (2009.01)
*H04B 7/04* (2006.01)
*H04B 7/06* (2006.01)

(52) U.S. Cl.
CPC ............ *H04B 7/0452* (2013.01); *H04B 7/0617* (2013.01); *H04B 7/0626* (2013.01)
USPC .......................................... 370/329; 370/252

(58) Field of Classification Search
USPC ......................... 370/203–210, 252, 310–350; 375/260–265
See application file for complete search history.

(56) References Cited

U.S. PATENT DOCUMENTS

| | | | | |
|---|---|---|---|---|
| 7,391,831 B2 * | 6/2008 | Lim | .............................. | 375/347 |
| 2006/0203794 A1 * | 9/2006 | Sampath et al. | .............. | 370/344 |
| 2008/0205533 A1 * | 8/2008 | Lee et al. | ...................... | 375/260 |
| 2011/0110405 A1 * | 5/2011 | Lee et al. | ...................... | 375/219 |

FOREIGN PATENT DOCUMENTS

| | | | |
|---|---|---|---|
| KR | 2004-0089748 A | 10/2004 |
| KR | 2005-0020576 A | 3/2005 |
| KR | 2006-0096360 A | 9/2006 |

* cited by examiner

*Primary Examiner* — Kan Yuen

(57) ABSTRACT

Disclosed is a frame transmission method using precoding for supporting MU-MIMO, which facilitates to reduce overhead of a downlink frame in a wireless communication system of FDD method, and a base station supporting that method. The frame transmission method comprises calculating a precoding matrix of a present frame based on channel state information (CSI) of each mobile station and a precoding matrix of a prior frame; precoding a dedicated pilot and downlink data to be transmitted to the mobile station by the use of precoding matrix of the present frame; and transmitting a downlink frame including the precoded dedicated pilot and precoded downlink data to the corresponding mobile station.

10 Claims, 2 Drawing Sheets

FRAME TRANSMISSION METHOD USING PRECODING FOR SUPPORTING MU-MIMO, AND BASE STATION SUPPORTING THE FRAME TRANSMISSION METHOD

FIELD OF THE INVENTION

The present invention relates to a frame transmission in a wireless communication system, and more particularly, to a frame transmission using precoding for supporting MU-MIMO in a wireless communication system.

BACKGROUND OF THE INVENTION

A 4G communication system capable of transmitting large-size data at high speed uses an OFDM (Orthogonal Frequency Division Multiplex) or OFDMA (Orthogonal Frequency Division Multiplex Access) method. The OFDM or OFDMA method divides a bandwidth into plural subcarriers, and transmits the subcarriers. That is, the OFDM or OFDMA method converts data rows provided in series into 'N' data columns provided in parallel; and then transmits the converted data columns while being carried on the respective subcarriers, to thereby improve data rate.

Also, an MIMO (Multi-Input Multi-Output) method is used for improving efficiency of data transmission in a communication system using the OFDM or OFDMA method, wherein the MIMO method transmits different data by the use of respective antennas provided in a base station. The MIMO method enables to obtain a diversity gain in the communication system, and also to improve data transmission rate.

By the use of MIMO method, data or signals may be received and transmitted between the base station and plural mobile stations. In case of this multi-user (MU) MIMO method, 'M' antennas are disposed in the base station; and 'N' antennas are disposed in the plural mobile stations. When the signals are received and transmitted by the use of disposed antennas, the data transmission rate is improved.

In order to provide MU multi-antenna service via the multi-antenna in the MU-MIMO method, the base station needs channel state information (CSI) of the plural mobile stations.

In the communication system of TDD (Time Division Duplex), since an uplink channel is symmetric to a downlink channel in channel properties, the channel state information can be easily obtained by the use of sounding symbols. Meanwhile, in the communication system of FDD (Frequency Division Duplex), since an uplink channel is not symmetric to a downlink channel in channel properties, feedback information including the channel state information (CSI) should be directly transmitted from the plural mobile stations.

A method for transmitting a frame in the communication system of FDD using the MU-MIMO method will be described as follows.

First, when the respective mobile stations feedback the channel state information generated by the use of common pilot transmitted from the base station to the base station, the base station groups some of the plural mobile stations, and calculates a precoding matrix for the grouped mobile stations by the use of channel state information about the grouped mobile stations. After precoding the data to be transmitted to the grouped mobile stations by using the precoding matrix, the precoded data together with a dedicated pilot precoded for detection of the precoded data and a common pilot for channel estimation is transmitted to the respective mobile stations.

The precoding is among the methods for improving reliability of the data transmission in the wireless communication system. That is, the data to be transmitted is precoded by the use of precoding matrix generated based on information for fading and interference occurring on the channel for the data transmission, and then the precoded data is transmitted, to thereby improve reliability of the data transmission.

As mentioned above, in case of the general MU-MIMO system of FDD method, the common pilot for channel estimation and the dedicated pilot for data detection should be included in the downlink data. Thus, if the number of transmit-antennas is increased in the base station, there are too many pilots contained in the downlink frame, whereby the increase of overhead in the downlink frame may cause waste of radio resource.

DISCLOSURE

Technical Problem

Accordingly, the present invention is directed to a frame transmission method using precoding for supporting MU-MIMO, and a base station supporting the frame transmission method that substantially obviates one or more problems due to limitations and disadvantages of the related art.

An aspect of the present invention is to provide a frame transmission method using precoding for supporting MU-MIMO, which facilitates to reduce overhead of a downlink frame in a wireless communication system of FDD method, and a base station supporting that method.

Technical Solution

To achieve these objects and other advantages and in accordance with the purpose of the invention, as embodied and broadly described herein, there is provided a frame transmission method using precoding for supporting MU-MIMO comprising: calculating a precoding matrix of a present frame based on channel state information (CSI) of each mobile station and a precoding matrix of a prior frame; precoding a dedicated pilot and downlink data to be transmitted to the mobile station by the use of precoding matrix of the present frame; and transmitting a downlink frame including the precoded dedicated pilot and precoded downlink data to the corresponding mobile station.

The step of calculating the precoding matrix of the present frame comprises: calculating a first precoding matrix based on the channel state information (CSI) of each mobile station; and calculating the precoding matrix of the present frame by multiplying the precoding matrix of the prior frame and the first precoding matrix.

In addition, the frame transmission method further comprises receiving feedback of the channel state information (CSI) from each mobile station before calculating the precoding matrix of the present frame.

Also, the frame transmission method comprises scheduling the downlink data to be transmitted to each mobile station by the use of channel state information (CSI) for each mobile station.

According to one embodiment of the present invention, the step of calculating the precoding matrix of the present frame comprises: selecting and grouping the mobile stations to be received with the downlink data in an MIMO method among the plural mobile stations; and calculating the precoding matrix of the present frame for the grouped mobile stations.

In another aspect of the present invention, there is provided a frame receiving method using precoding for supporting MU-MIMO comprising: receiving a precoded dedicated pilot from a base station; creating channel state information by estimating a channel with the base station by the use of precoded dedicated pilot; and feedbacking the created channel state information to the base station.

In addition, the frame receiving method further comprises detecting precoded downlink data included in the downlink frame received from the base station by the use of precoded dedicated pilot.

In another aspect of the present invention, there is provided a frame receiving method using precoding for supporting MU-MIMO comprising: receiving feedback of precoded channel matrix from a mobile station; and obtaining an original channel matrix by multiplying the precoded channel matrix and an inversion matrix of precoding matrix used in a prior frame.

In another aspect of the present invention, there is provided a base station comprising: a precoder for calculating an accumulative precoding matrix of a present frame based on channel state information (CSI) feedbacked from each mobile station and an accumulative precoding matrix of a prior frame, and precoding a dedicated pilot and downlink data to be transmitted to the corresponding mobile station by the use of accumulative precoding matrix of the present frame; and a frame transmitter for transmitting a downlink frame including the precoded dedicated pilot and precoded downlink data to the corresponding mobile station.

According to one embodiment of the present invention, the precoder comprises a new precoding matrix calculator for calculating a new precoding matrix based on the channel state information (CSI) of each mobile station; a memory for storing the accumulative precoding matrix of the prior frame; and an accumulative precoding matrix calculator for calculating the accumulative precoding matrix of the present frame by combining the new precoding matrix and the accumulative precoding matrix of the prior frame.

Advantageous Effects

According to the present invention, the downlink frame includes only the dedicated pilot for channel estimation in the communication system of FDD method, whereby the overhead of the downlink frame is reduced, to thereby prevent a waste of radio resource.

MODE FOR INVENTION

Reference will now be made in detail to the preferred embodiments of the present invention, examples of which are illustrated in the accompanying drawings. Hereinafter, for convenience of explanation, a data symbol will be abbreviated to data; and a pilot symbol will be abbreviated to a pilot.

Figure 1:
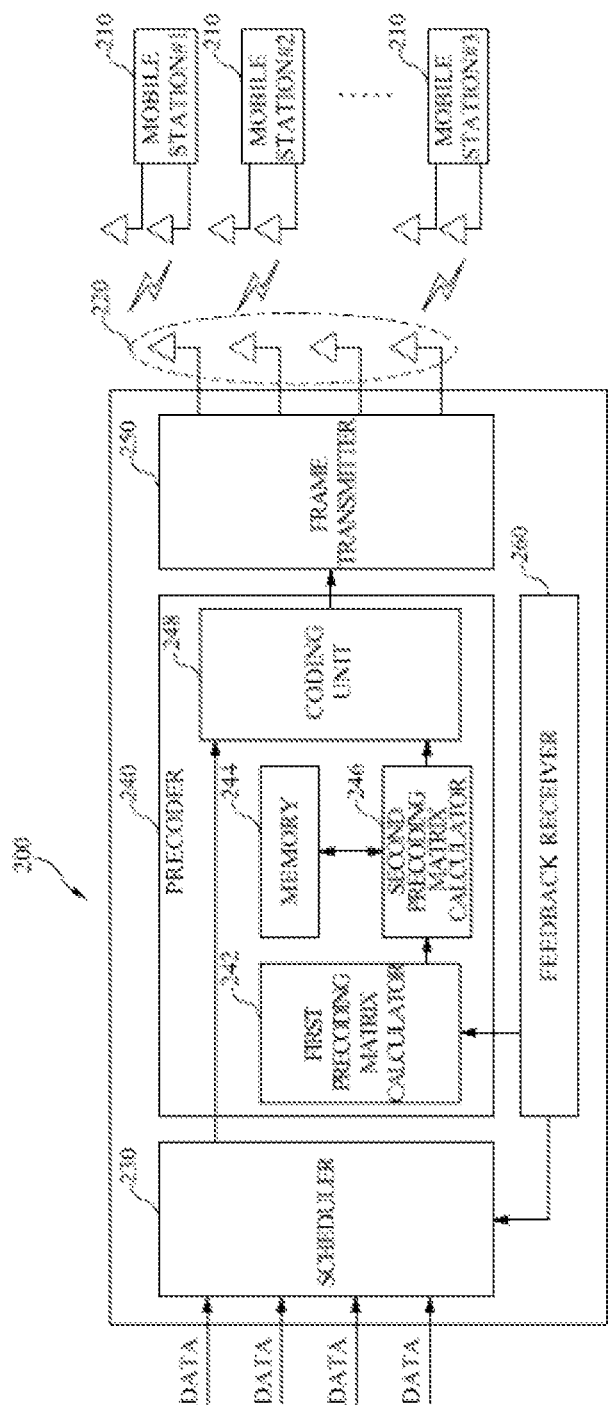
FIG. 1 is a block diagram illustrating a base station supporting an MU-MIMO method in a communication system of FDD method according to one embodiment of the present invention.

FIG. 1 is a block diagram illustrating a base station supporting an MU-MIMO method in a communication system of FDD method according to one embodiment of the present invention. The base station 200 may transmit data to multi-users (MU) by an MIMO method. There are plural transmit-antennas 220 disposed in the base station 200. One antenna or plural antennas may be disposed in each mobile station.

First, the base station 200 includes a scheduler 230, a precoder 240, a frame transmitter 250, and a feedback receiver 260.

The scheduler 230 carries out a scheduling operation for transmission of data received from an upper layer in consideration to channel state information (CSI) feedbacked from each mobile station. In more detail, the scheduler 230 composes a frame for transmission of downlink data by determining a modulation and coding scheme level of the data to be transmitted to each mobile station in consideration to the channel state information (CSI) feedbacked from each mobile station, allocating a burst for the data to be transmitted to each mobile station, and generating a map message to indicate an allocation for the corresponding burst.

When the aforementioned scheduling operation is carried out by the scheduler 230, a dedicated pilot to be used for channel estimation of each mobile station may be arranged according to a predetermined pattern.

After that, the scheduler 230 provides the downlink data and dedicated pilot to the precoder 240.

Figure 2:
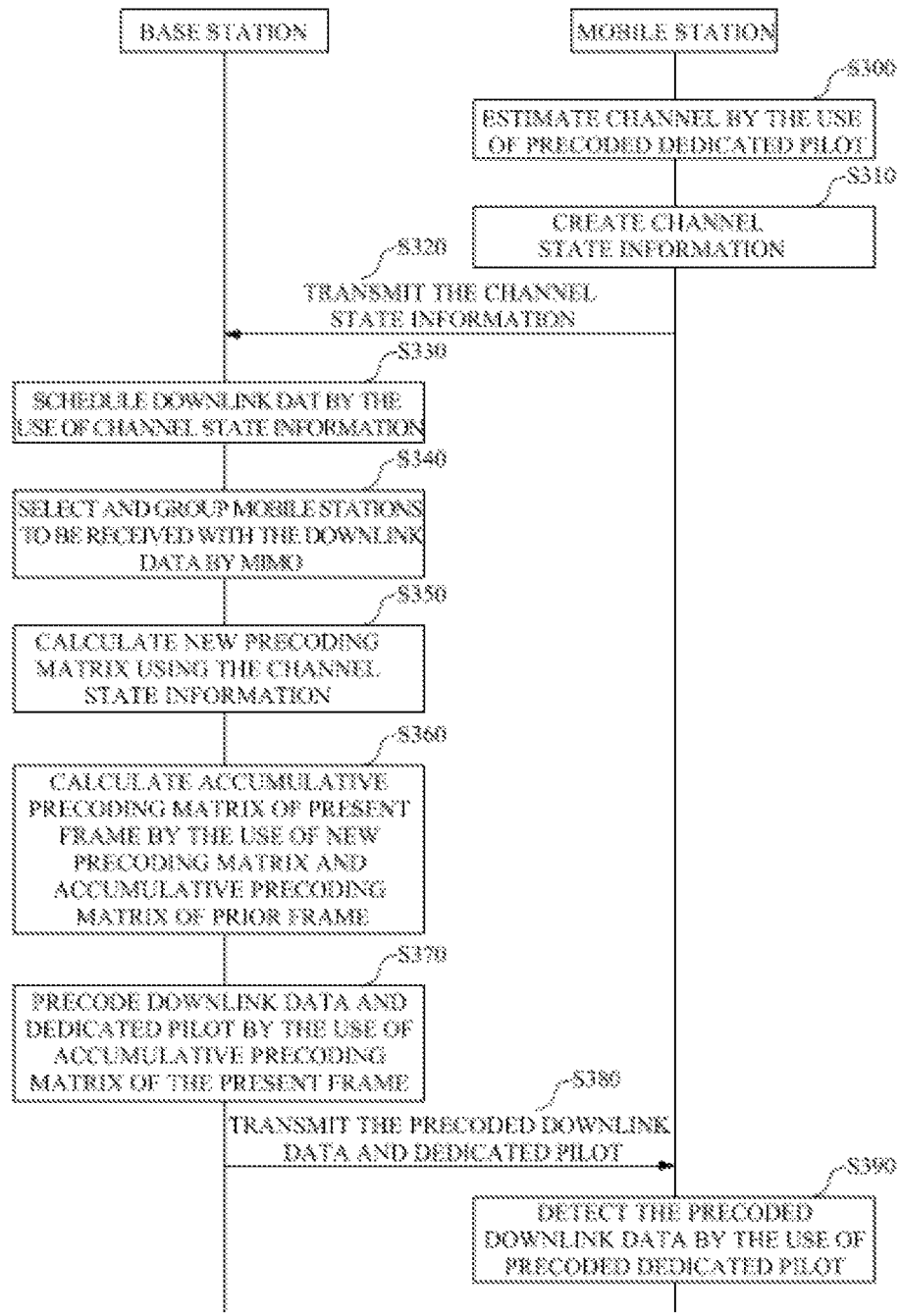
FIG. 2 is a flowchart illustrating a data transmission method of MU-MIMO method by the use of precoding matrix according to one embodiment of the present invention.

The precoder 240 calculates a precoding matrix; and precodes the downlink data and dedicated pilot provided from the scheduler 230 by using the calculated precoding matrix. As shown in FIG. 2, the precoder 240 includes a first precoding matrix calculator 242, a memory 244, a second precoding matrix calculator 246, and a coding unit 248.

The first precoding matrix calculator 242 calculates a new precoding matrix based on channel state information (CSI) of each mobile station 210 received by the feedback receiver 260. According to one embodiment of the present invention, the channel state information (CSI) feedbacked from each mobile station 210 is created by the channel estimation using precoded dedicated pilot.

On calculation of the new precoding matrix by the first precoding matrix calculator 242, the first precoding matrix calculator 242 groups some mobile stations among the plural mobile stations (for example, in groups of two mobile stations), wherein the grouped mobile stations transmit the data by the MIMO method; and calculates the new precoding matrix for the mobile stations included in the corresponding group by the use of channel state information (CSI) feedbacked from the mobile stations included in each group.

An accumulative precoding matrix calculated by the prior frame is stored in the memory 244.

The second precoding matrix calculator 246 calculates the accumulative precoding matrix of the present frame by the use of new precoding matrix calculated by the first precoding matrix calculator 242, and accumulative precoding matrix of the prior frame stored in the memory 244. According to one embodiment of the present invention, the second precoding matrix calculator 246 may calculate the accumulative precoding matrix of the present frame by multiplying the new precoding matrix and the accumulative precoding matrix of the prior frame.

Then, the second precoding matrix calculator 246 stores the accumulative precoding matrix of the present frame in the memory 244; and simultaneously provides the accumulative precoding matrix of the present frame to the coding unit 248. The accumulative precoding matrix of the present frame stored in the memory 244 may be used when calculating the accumulative precoding matrix of the next frame.

The coding unit 248 precodes the downlink data and dedicated pilot provided from the scheduler 230 by the use of accumulative precoding matrix of the present frame provided from the second precoding matrix calculator 246; and provides the downlink frame including the precoded data and dedicated pilot to the frame transmitter 250.

The accumulative precoding by the aforementioned precoder 240 may be expressed as the following equation 1.

$$\overline{H} = \begin{bmatrix} H_1 V_{11} & 0 & 0 & 0 \\ 0 & H_2 V_{21} & 0 & 0 \\ 0 & 0 & H_3 V_{31} & 0 \\ 0 & 0 & 0 & H_4 V_{41} \\ H_5 V_{11} & H_5 V_{21} & H_5 V_{31} & H_5 V_{41} \\ \vdots & \vdots & \vdots & \vdots \\ H_{K_r} V_{11} & H_{K_r} V_{21} & H_{K_r} V_{31} & H_{K_r} V_{41} \end{bmatrix} = \begin{bmatrix} H_1 V_1 \\ H_2 V_1 \\ H_3 V_1 \\ H_4 V_1 \\ H_5 V_1 \\ \vdots \\ H_{K_r} V_1 \end{bmatrix} \quad \text{[Equation 1]}$$

wherein, $V_{ik}$ indicates the precoding matrix in the k(th) frame for the (i)th mobile station, which indicates $$V_j = [V_{1j} V_{2j} V_{3j} V_{4j}].$$

If scheduling the next frame having $\overline{H}$ shown in the above equation 1, the prior-selected mobile stations might not be helpful due to '0' channel element. This causes a reduction of effective channel power.

A modified embodiment of the present invention proposes a power adjusted accumulated precoding. This power adjusted accumulated precoding may be expressed as the following equation 2.

$$\overline{H}' = \begin{bmatrix} H_1 V_{11} & 0 & 0 & 0 \\ 0 & H_2 V_{21} & 0 & 0 \\ 0 & 0 & H_3 V_{31} & 0 \\ 0 & 0 & 0 & H_4 V_{41} \\ 0.5 H_5 V_{11} & 0.5 H_5 V_{21} & 0.5 H_5 V_{31} & 0.5 H_5 V_{41} \\ \vdots & \vdots & \vdots & \vdots \\ 0.5 H_{K_r} V_{11} & 0.5 H_{K_r} V_{21} & 0.5 H_{K_r} V_{31} & 0.5 H_{K_r} V_{41} \end{bmatrix} = \quad \text{[Equation 2]}$$

$$\begin{bmatrix} H_1 V_1 \\ H_2 V_1 \\ H_3 V_1 \\ H_4 V_1 \\ 0.5 H_5 V_1 \\ \vdots \\ 0.5 H_{K_r} V_1 \end{bmatrix}$$

wherein, the selected mobile stations have $\overline{H}$.

As shown in the above equation 2, the power adjusted accumulated precoding multiplies the unselected mobile stations for the channels whose coherence time is larger than one frame by ½ which may be adaptively adjusted in accordance with the coherence time.

As mentioned above, the precoder 240 of the present invention precodes the data and dedicated pilot by using the accumulative precoding matrix of the present frame instead of the new precoding matrix calculated based on the channel state information (CSI), wherein the accumulative precoding matrix of the present frame is calculated by combining the accumulative precoding matrix of the prior frame with the new precoding matrix. Thus, the accumulative precoding matrix of the prior frame may be reflected on the present frame.

The frame transmitter 250 provides the downlink frame including the precoded data and precoded dedicated pilot to each mobile station 210. According to one embodiment of the present invention, the frame transmitter 250 provides the downlink frame including the precoded data and precoded dedicated pilot to the respective mobile stations 210 included in each group via the different transmit-antennas.

The feedback receiver 260 receives the feedback including the channel state information (CSI) about each mobile station 210 from each mobile station 210; and provides the channel state information (CSI) included in the received feedback to the scheduler 230, and the first precoding matrix calculator 242 of the precoder 240.

In the related art, the common pilot used for the channel estimation as well as the precoded data and dedicated pilot should be transmitted to each of the mobile stations. In the present invention, since each mobile station is capable of accomplishing the channel estimation by the use of precoded dedicated pilot, there is no need to additionally transmit the common pilot to each mobile station, to thereby reduce overhead of the downlink frame.

The plural mobile stations 210 receive the downlink frame including the precoded data and precoded dedicated pilot from the base station 200; create the channel state information (CSI) by estimating the channel by the use of precoded dedicated pilot included in the received downlink frame; and then feedback the created channel state information (CSI) to the base station 200.

That is, in the related art, the mobile station 210 estimates the channel state by the use of common pilot; and detects the received data by the use of precoded dedicated pilot. Meanwhile, in the present invention, the mobile station 210 accomplishes the channel state estimation and the detection of data received therein by using the precoded dedicated pilot.

According to another embodiment of the present invention, the (i)th mobile station 210 creates the feedback information shown in the following equation 3 by accomplishing the channel estimation; and then transmits the created feedback information to the base station 200.

$$H_i(V_1\phi_1 + V_2\phi_2 + V_3\phi_3 + V_4\phi_4) \times [\phi_1'\phi_2'\phi_3'\phi_4'] = [H_i V_1 H_i V_2 H_i V_3 H_i V_4] \quad \text{[Equation 3]}$$

wherein, $\phi_1, \phi_2, \phi_3, \phi_4$ indicate the pilots which are orthogonal to one another.

Meanwhile, the base station 200 receives the aforementioned feedback information shown in the above equation 3, wherein the above equation 3 may be expressed as the following equation 4. The base station 200 may estimate a raw channel by a precoding inversion scheme expressed as the following equation 5.

$$[H_i V_1 H_i V_2 H_i V_3 H_i V_4] = H_i \times [V_1 V_2 V_3 V_4] \quad \text{[Equation 4]}$$
$$= H_i V$$

wherein, $[V_1 V_2 V_3 V_4] = V$.

$$H_i = [H_i V_1 H_i V_2 H_i V_3 H_i V_4] V^{-1} \quad \text{[Equation 5]}$$

$$[V_1 V_2 V_3 V_4] = V$$

wherein, $$H_i = [H_i V_1 H_i V_2 H_i V_3 H_i V_4] V^{-1} \quad \text{[Equation 5]}$$

In the above equation 5, $V^{-1}$ may be obtained through simulation.

A frame transmission method using precoding for supporting MU-MIMO will be explained with reference to FIG. 2.

FIG. 2 is a flowchart illustrating a frame transmission method using precoding for supporting MU-MIMO according to one embodiment of the present invention. First, each mobile station estimates the channel by the use of precoded dedicated pilot transmitted from the base station in S300. Then, the channel state information (CSI) is created through the channel estimation in S310; and the created channel state information is feedbacked to the base station in S320.

Next, the base station schedules the downlink data to be transmitted to the corresponding mobile station by the use of channel state information (CSI) feedbacked from the mobile station in S330. According to one embodiment of the present invention, when scheduling the data, the base station may arrange the dedicated pilots to be transmitted to the respective mobile stations according to the predetermined pilot-arrangement pattern.

Thereafter, the base station selects and groups the mobile stations to be received with the data in the MIMO method among the plural mobile stations in S340; and calculates the new precoding matrix by the use of channel state information (CSI) feedbacked from the grouped mobile stations in S350.

After that, the accumulative precoding matrix of the present frame is calculated by combining the new precoding matrix calculated in S350 with the accumulative precoding matrix of the prior frame stored in the memory in S360. On calculation of the precoding matrix according to the present invention, the accumulative precoding matrix of the present frame is calculated in consideration to the accumulative precoding matrix of the prior frame as well as the new precoding matrix based on the present channel state information, whereby the accumulative precoding matrix of the prior frames may be reflected on the present frame.

The accumulative precoding matrix generated by the aforementioned steps is stored in the memory. The accumulative precoding matrix of the present frame stored in the memory is used for calculating the accumulative precoding matrix of the next frame.

Then, the downlink data and dedicated pilot to be transmitted to the mobile station included in each group is precoded by the use of accumulative precoding matrix of the present frame in S370; and the downlink frame including the precoded downlink data and precoded dedicated pilot is provided to the mobile station included in each group in S380.

According to one embodiment of the present invention, when providing the downlink frame including the precoded downlink data and precoded dedicated pilot to each mobile station, the downlink frames including the precoded downlink data and precoded dedicated pilot are provided to the respective mobile stations through the different antennas.

After the mobile station receives the downlink frame including the precoded downlink data and precoded dedicated pilot, the mobile station detects the downlink data received therein by the use of precoded dedicated pilot in step S390. Then, after the respective mobile stations which receive the precoded dedicated pilot are returned to the step S300, their channels are estimated by the use of precoded dedicated pilot provided in the step S380.

The aforementioned frame transmission method using precoding for supporting MU-MIMO can be performed by the use of various computer means. At this time, a program for the frame transmission method using precoding for supporting MU-MIMO is recorded in a computer-readable recording medium, for example, hard disc, CD-ROM, DVD, ROM, RAM, or flash memory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting data in a wireless communication system, comprising:
    determining a channel precoding matrix based on channel state information received from a receiver;
    determining a current precoding matrix based on a previous precoding matrix stored in a memory and the channel precoding matrix; and
    precoding data with the current precoding matrix;
    transmitting the precoded data to the receiver via a plurality of antennas;
    storing the current precoding matrix as the previous precoding matrix into the memory; and
    repeating the steps of determining a channel precoding matrix, determining a current precoding matrix, precoding, transmitting, and storing, for next data transmission,
    wherein the precoding data comprises precoding data and a dedicated pilot with the current precoding matrix,
    wherein the transmitting the precoded data comprises transmitting the precoded data and the precoded dedicated pilot to the receiver via the plurality of antennas, and
    wherein the channel state information is created by multiplying the precoded dedicated pilot received by the receiver and the dedicated pilot.

2. The method of claim 1, wherein the current precoding matrix is determined by combining the previous precoding matrix and the channel precoding matrix.

3. The method of claim 2, wherein an offset value is multiplied by the current precoding matrix.

4. The method of claim 3, wherein the offset value is ½.

5. A transmitter configured for transmitting data in a wireless communication system, comprising:
    a precoder configured to:
        determine a channel precoding matrix based on channel state information received from a receiver;
        determine a current precoding matrix based on a previous precoding matrix stored in a memory and the channel precoding matrix; and
        precode data with the current precoding matrix; and
        store the current precoding matrix as the previous precoding matrix into the memory; and
    a transmitting unit configured to transmit the precoded data to the receiver via a plurality of antennas,
    wherein the precoder is further configured to precode the data and a dedicated pilot with the current precoding matrix,
    wherein the transmitting unit is configured to transmit the precoded data and the precoded dedicated pilot to the receiver via the plurality of antennas, and
    wherein the channel state information is created by multiplying the precoded dedicated pilot received by the receiver and the dedicated pilot.

6. The transmitter of claim 5, wherein the precoder is configured to receive the channel state information from the receiver.

7. The transmitter of claim 5, wherein the current precoding matrix is determined by combining the previous precoding matrix and the channel precoding matrix.

8. The transmitter of claim 7, wherein an offset value is multiplied by the current precoding matrix.

9. The transmitter of claim 8, wherein the offset value is ½.

10. A frame receiving method using precoding for supporting multi-user multi-input multi-output (MU-MIMO), comprising:

receiving precoded data and a precoded dedicated pilot transmitted from a base station which uses a plurality of antennas;
performing data detection using the received precoded dedicated pilot;
creating channel state information by multiplying the received precoded dedicated pilot and a dedicated pilot; and
transmitting the channel state information to the base station,
wherein creating channel state information comprises creating the channel state information by multiplying the received precoded dedicated pilot and a dedicated pilot, and wherein the precoded data transmitted from the base station is generated by:
  determining a channel precoding matrix based on channel state information received from a receiver;
  determining a current precoding matrix based on a previous precoding matrix stored in a memory and the channel precoding matrix; and
  precoding data with a current precoding matrix.

* * * * *